Sept. 14, 1926.

W. C. NABORS

TRAILER HITCH

Filed Nov. 13, 1925

1,599,834

WITNESSES

INVENTOR
W. C. NABORS,
BY
ATTORNEYS

Patented Sept. 14, 1926.

1,599,834

UNITED STATES PATENT OFFICE.

WILLIAM C. NABORS, OF MANSFIELD, LOUISIANA.

TRAILER HITCH.

Application filed November 13, 1925. Serial No. 68,891.

My invention relates to improvements in trailer hitches, and it consists in the combinations, constructions and arrangements herein described and claimed.

An object of the invention is the provision of a simple and reliable construction for connecting the front end of a reach pole or tongue of a trailer with a frame member of the chassis of an automobile truck of a well known type of construction without any change in the construction of said frame member of the automobile truck being required and so that the trailer hitch can be removed quickly and easily from the frame member of the automotive truck when desired.

A further object of the invention is the provision of a trailer hitch of the character described which affords facilities for connecting the reach pole or tongue of a trailer with the frame member of an automotive vehicle so that the reach pole or tongue can swing both vertically and horizontally without transmitting motion to the frame member of the automotive vehicle.

Figure 1:
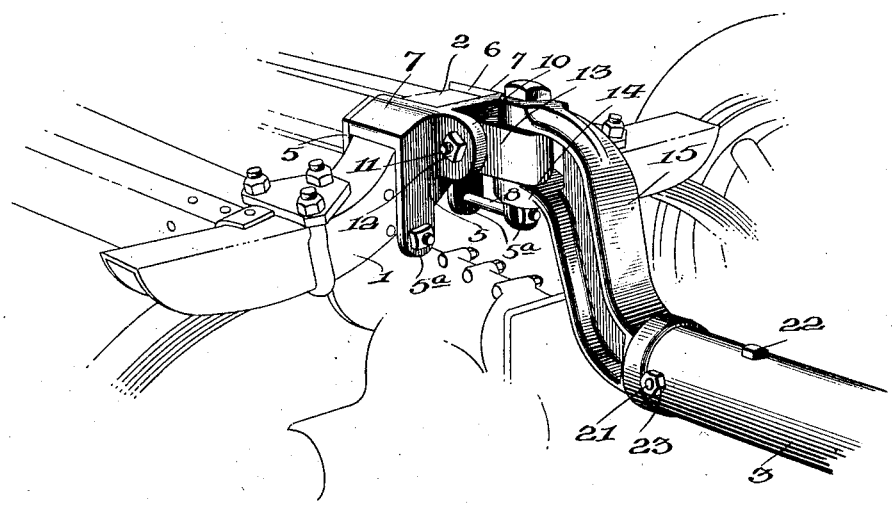

Other objects and advantages of the invention will be apparent from the following description, considered in conjunction with the accompanying drawings, in which Figure 1 is a fragmentary perspective view showing a trailer hitch embodying the invention in position to connect a trailer reach pole with the rear cross member of the frame of an automobile truck, only portions of the reach pole and the automotive truck being shown.

Figure 2:
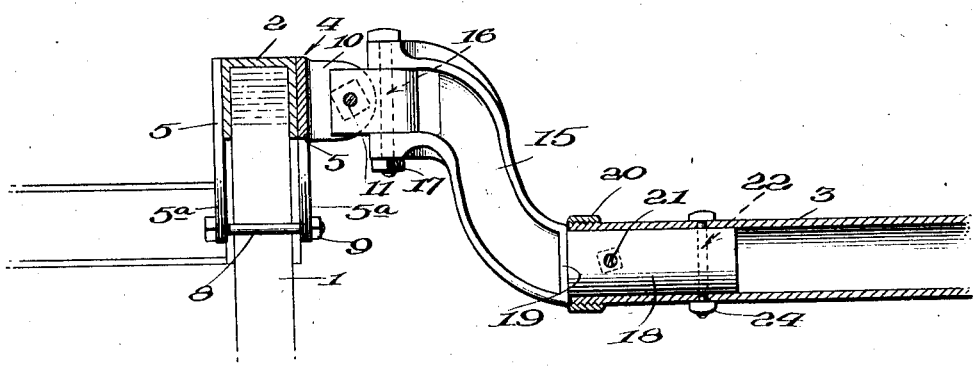

Figure 2 is a longitudinal vertical section through the structure exhibited in Figure 1.

The chassis of an automotive truck of a well known type of construction includes a rear cross member such as indicated at 1 in Figure 1. This rear cross member is a part of the frame of the chassis and is an inverted channel member having the middle portion thereof bowed upwardly or arched as indicated at 2. The invention contemplates the provision of means for quickly and easily connecting the front end of a trailer reach pole or tongue 3 with the middle portion of the cross member 1 of the automotive truck frame so that the reach pole can swing about both vertical and horizontal axes without imparting motion to the rear cross member 1. In carrying out the invention, I provide a draw head or bracket 4 which comprises a body of inverted channel or U-shape in cross section, this body being adapted to fit over the arched middle portion of the cross member 1 so that the arms 5 of the body of the bracket will straddle the middle portion of the cross member 1 and the web of the bracket will be superimposed on the arched middle portion of the cross member 1. The web of the bracket is cut away intermediate its length as indicated at 6 to receive the crown or highest portion of the upwardly arched middle portion of the cross member 1, the web of the bracket thus comprising only a pair of oppositely inclined end portions 7 which are inclined downwardly toward their outer ends and which therefore contact closely with the sloping portions of the top of the arched middle portion 2 of the cross member 1 intermediate the transverse median line of said cross member. The side members 5 of the bracket are extended downwardly adjacent to their opposite ends to produce pairs of depending ears $5^a$ which extend below the arched middle portion of the cross member 1. The ears $5^a$ of each pair have aligned openings for the reception of a bolt 8 which extends transversely of the cross member 1 in contact with the under side of the latter. Each bolt 8 is engaged by a nut 9 and the bracket thus will be held against upward movement relatively to the middle portion of the cross member 1. Moreover, the bracket will be held against longitudinal movement on the cross member 1 since the highest part of the cross member 1 will engage with opposite edges of the opening 6 when the bolts 8 are in place and the end portions 7 of the web of the bracket are clamped against oppositely sloping portions of the web or top member of the arched portion 2 of the cross frame member 1.

The bracket is formed with a pair of horizontally aligned parallel ears 10 on the rearward side 5, the respective ears 10 being located at opposite sides of the transverse median line of the bracket and extending rearwardly from the rear side member 5 of the bracket as clearly shown. The ears 10 have aligned openings formed therein for the reception of a horizontal coupling and pivot pin 11 which is shown as being a bolt that is held against accidental displacement by the head thereof in conjunction with a nut 12 which is in threaded engagement with the bolt. The bolt 11 extends through a transverse opening in the forward end portion of a coupling member or solid link 13. The front end portion of the coupling member 13 of course is disposed between the ears 10 and the coupling member 13 is swingable in a vertical plane about the axis of the bolt 11. The rearward end portion of the coupling member 13 is received between the vertically spaced forks 14 of a coupling member 15. The forks 14 and the rearward end portion of the coupling member 13 have aligned vertical openings through which a vertical bolt 16 extends. The bolt 16 constitutes a pivot element and the lower end portion of the shank thereof is engaged by a nut 17.

The coupling member 13 is reversely curved longitudinally thereof so that the rearward end portion of the coupling member 15 will be offset downwardly from the forked front end portion of the coupling member 15. This rearward end portion of the coupling member 15 is indicated at 18 in Figure 2 and is shown as being circular in cross sectional contour and adapted to enter the bore of the reach pole 3 which is shown as being a tube. A rearwardly facing shoulder 19 is provided at the front end of the circular rearward and lower end portion 18 of the coupling member 15 and serves as a stop for engaging with the front end of the tubular reach pole 3. This tubular reach pole 3 may be provided with a collar 20 on the forward end portion thereof for strengthening the reach pole at its forward end. This collar is shown as being in threaded engagement with the reach pole. The forward end portion of the reach pole rearwardly of the collar 20 is rigidly secured to the rearward end portion 18 of the coupling member 15 by suitable fastening devices, such as the horizontal bolt 21 and the vertical bolt 22, these bolts extending through aligned openings in lapped portions of the coupling member and the reach pole. The bolt 21 is threadedly engaged by a nut 23 and the bolt 22 is threadedly engaged by a nut 24 so that the bolts 21 and 22 are held against accidental displacement.

From the foregoing description of the various parts of the device, the operation thereof may be readily understood. The bracket which constitutes the draw head of the device can be displaced from position on the cross member 1 when desired merely by removing the bolts 8 and then lifting the bracket bodily from position on the cross member 1. When the bracket is secured to the cross member 1 as shown in the drawings, it will be substantially rigid with the cross member 1. It will be manifest that the reach pole swings both vertically and horizontally without imparting motion to the cross member 1 and that the cross member 1 also can swing both horizontally and vertically without imparting motion or causing any strain on the reach pole 3.

Obviously, the invention is susceptible of embodiment in forms other than that illustrated in the accompanying drawings and I therefore consider as my own all such modifications and adaptations thereof as fairly fall within the scope of the appended claims.

I claim:—

1. A draft connection of the character described comprising a bracket of substantially inverted U-shape, the arms of said bracket being adapted to straddle the rear cross member of the frame of an automotive vehicle and having portions at the opposite ends of said bracket extending downwardly below the lower edge of the associated portion of said rear cross member, means extending transversely under said cross member between the extending portions of corresponding arms of said bracket for holding said bracket against displacement from position on said rear cross member, a trailer reach pole, and a connection between the forward end of said trailer reach pole and said bracket.

2. A draft connection of the character described comprising a substantially inverted U-shaped bracket having arms adapted to straddle the arcuate middle portion of the rear cross member of the frame of an automotive vehicle, the web of said bracket comprising end portions which slope oppositely and are superimposed on oppositely sloping portions of the arched cross member of the frame of the automotive vehicle, fastening means extending between the sides of said bracket underneath said rear cross member of the frame of the automotive vehicle for holding said bracket in place on said cross member of the frame of the vehicle, a reach pole, and a universal joint between the front end of said reach pole and the rear side member of said bracket.

3. A draft connection of the character described comprising a substantially inverted U-shaped bracket having arms adapted to straddle the arcuate middle portion of the rear cross member of the frame of an automotive vehicle, the web of said bracket being cut away intermediate its length to receive the highest portion of the top of said cross member, the web of said bracket thus comprising end portions which slope oppositely and are superimposed on oppositely sloping portions of the arched cross member of the frame of the automotive vehicle, fastening means extending between the sides of said bracket underneath said rear cross member of the frame of the automotive vehicle for holding said bracket in place on said cross member of the frame of the vehicle, a reach pole, and means for connecting said reach pole with said bracket.

4. In a draft hitch of the character described, a bracket attachable to the middle portion of the rear cross member of the frame of an automotive vehicle, a coupling member having front and rear end portions offset vertically with respect to each other, said front portion of the coupling member being higher than the rear portion of the coupling member, a universal joint connecting said front end portion of said coupling member and said bracket, and a reach pole having a tubular forward end portion overlapping said rearward end portion of said coupling member and rigidly secured to said rearward end portion of the coupling member.

WILLIAM C. NABORS.